Dec. 31, 1968  J. T. SARVAY  3,418,773
GASKETING SYSTEM
Filed Jan. 26, 1967

INVENTOR.
JOHN T. SARVAY
BY
Meyer, Tilberry & Body
ATTORNEYS.

United States Patent Office 3,418,773
Patented Dec. 31, 1968

3,418,773
GASKETING SYSTEM
John T. Sarvay, Cleveland, Ohio, assignor to The Standard Products Company, Cleveland, Ohio, a corporation of Ohio
Filed Jan. 26, 1967, Ser. No. 612,045
2 Claims. (Cl. 52—400)

ABSTRACT OF THE DISCLOSURE

A gasketing system for mounting a construction panel in a channel shaped frame, the system having two sections, each with an outer surface wedging against a sidewall of the channel, and an inner surface wedging against opposite sides of the construction panel. A modification has a third section which fits between the two sections and cushions an edge portion of the construction panel.

This invention relates to the gasket art and more particularly to a gasketing system.

The present invention is particularly applicable to gasketing systems adapted to be interposed between the edge portions of a construction panel, such as sheet glass, and a frame, and it will be described with particular reference thereto; however, it will be appreciated that the invention has broader applications and may be used in various other gasketing arrangements.

Resilient gaskets, formed from elastomeric materials, such as neoprene, are widely used for mounting, sealing, and cushioning construction panels, such as sheet glass, in a wall of a building or in automobile bodies. The effectiveness of such gaskets depends on their ability to maintain a construction panel under substantially uniform, continuous, compression, and thereby develop a satisfactory sealing relationship between the construction panel and frame. In mnay prior art arrangements, this can only be accomplished by using additional materials such as tapes, locking strips, sealants, and the like, all of which are time consuming to install, and in many instances require special installation tools.

The present invention is addressed to a gasketing system of simplified construction, which satisfies the aforementioned requirements, without requiring the use of additional materials.

In accordance with the present invention, there is provided a gasketing system for mounting a construction panel in a frame member having a channel shaped opening, defined by a bottom and a pair of opposed side walls, comprising: a first resilient gasket element having a base portion adapted to be recieved in a channel shaped opening, and a pair of complementary surfaces adapted to sealingly engage, respectively, an edge portion and a face portion of a construction panel; and a second resilient gasket element having a base portion adapted to be received in a channel shaped opening, and a surface adapted to sealingly engage a face portion of a construction panel, the combined widths of the base portions of the first and second gasket elements being substantially equal to the width of the channel shaped opening.

In accordance with another aspect of the invention, there is provided, in combination with a frame member having a channel shaped opening defined by a bottom and a pair of opposed side walls, a gasketing system of the type described above.

It is, therefore, an object of the present invention to provide a gasketing system of improved construction.

A further object of the invention is to provide a gasketing system capable of applying substantially uniform continuous pressure to a construction panel.

Yet another object of the invention is to provide a gasketing system of improved construction which obviates the needs for additional materials such as tapes, locking strips, sealants, and the like.

These and other objects and advantages will become apparent from the following detailed description of a preferred embodiment of the invention when read in connection with the accompanying drawings, in which.

Figure 1:
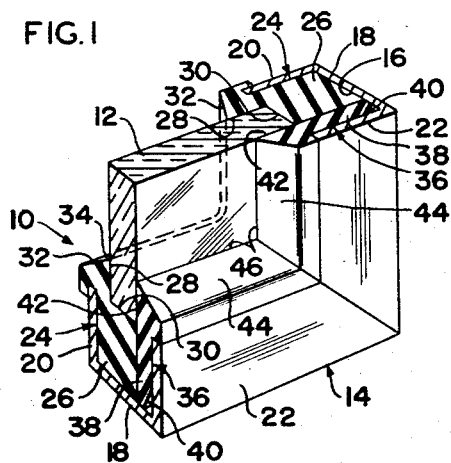
FIGURE 1 is a fragmentary, schematic, perspective view, showing a preferred embodiment of the invention.
Figure 2:
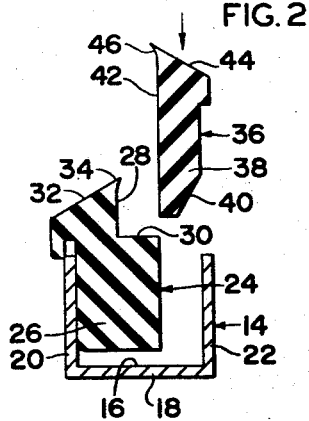
FIGURE 2 is a schematic, section view, of the embodiment shown in FIGURE 1, partially installed.

Referring now to the drawings, wherein the showings are for purposes of illustrating preferred embodiments of the invention only, and not for the purpose of limiting the same, FIGURES 1 and 2 show gasketing system 10 interposed between a construction panel, such as sheet glass 12, and frame member 14, the latter comprising channel shaped opening 16 defined by bottom 18 and side walls 20 and 22.

Gasketing system 10 comprises first resilient gasket element 24, haivng base portion 26 adapted to be received in channel shaped opening 16, and a pair of complementary surfaces 28 and 30, adapted to sealingly engage, respectively, an edge portion and a face portion of sheet glass 12. First resilient gasket element 24 is further provided with outwardly extending wing portion 32, adapted to sealingly engage the end of side wall 20 defining channel shaped opening 16, and inwardly directed lip 34, adapted to sealingly engage a face portion of sheet glass 12 (see FIGURE 2). In one preferred form of the invention element 24 defines a single, continuous loop or complete unit of material, having vulcanized corners (see FIGURE 1), so that it can be installed in one piece around the entire periphery of a frame.

Gasketing system 10 further comprises second resilient gasket element 36, having base portion 38 adapted to be received in channel shaped opening 16. Base portion 38 is provided with wedge shaped cutout 40, to facilitate the insertion of gasket element 36 into channel shaped opening 16. It will be noted from FIGURE 1 that the combined widths of base portions 26 and 38 are substantially equal to the width of channel shaped opening 16. Second resilient gasket element 36 is further provided with surface 42 adapted to sealingly engage a face portion of sheet glass 12, outwardly extending wing 44, adapted to engage the end of side wall 22 of channel shaped opening 16, and inwardly directed lip 46, adapted to sealingly engage a face portion of sheet glass 12.

The gasketing system is installed by inserting first resilient gasket element 24 which as noted above is preferably in the form of a single, continuous loop having vulcanized corners, in channel shaped opening 16 so that outwardly extending wing 44 engages the end of side wall 20. Next, sheet glass 12 is inserted so that an edge portion sealing engages surfaces 30 of first resilient gasket element 24, and a face portion engages surface 28 thereof. Finally, second resilient gasket element 36 is inserted in channel shaped opening 16, and forced downwardly until its outwardly extending wing 44 sealingly engages the end of side wall 22 of channel shaped opening 16.

Figure 3:
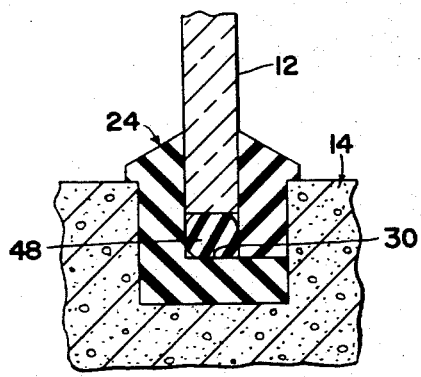
FIGURE 3 is a schematic, section view, of a modification of the embodiment shown in FIGURE 1.

FIGURE 3 shows a modified form of the invention wherein resilient filler strip 48 is positioned on surface 30 of first resilient gasket element 24, whereby resilient filler strip 48 and surface 30 of first resilient gasket element 24 coact to seal and cushion the edge portion of sheet glass 12.

Figure 4:
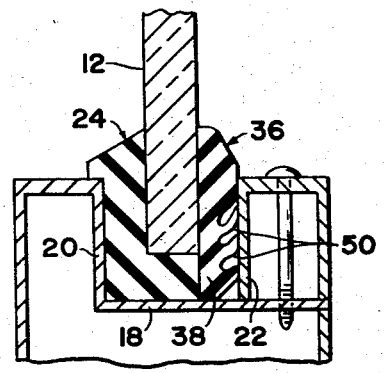
FIGURE 4 is a schematic, section view, of another modification of the embodiment shown in FIGURE 1.

FIGURE 4 shows a further modification of the invention, wherein base portion 38 of second resilient gasket element 36 comprises a channel side wall engaging surface, provided with a plurality of sealing fingers 50. In the preferred form shown, sealing fingers 50 extend upwardly and outwardly with respect to bottom 18 of channel shaped opening 16. Thus, as second resilient gasket element 36 is forced downwardly into sealing engagement with channel shaped opening 16, sealing fingers 50 become compressed against each other facilitating the insertion of second resilient gasket element 36. However, the application of an upward force to second resilient gasket element 36 causes sealing fingers 50 to frictionally engage side wall 22, thereby effectively resisting the upward force.

The present invention has been described in conjunction with certain structural embodiments; however, it is to be appreciated that various structural changes may be made in the illustrated embodiments without departing from the intended scope and spirit of the present invention as defined in the appended claims.

Having thus described my invention, I claim:

1. In combination with a frame member having a channel shaped opening defined by a bottom and a pair of opposed sidewalls, a gasketing system for mounting a construction panel in said frame member, comprising: a first resilient gasket element having a generally L-shaped base portion received in said channel shaped opening, extending the full length of one of said channel sidewalls and the full width of said channel bottom, and having a surface parallel to said one sidewall adapted to sealingly engage a face portion of a construction panel, and a surface parallel to said bottom, adapted to be spaced from an edge portion of said construction panel; a second resilient gasket element having a base portion received in said channel opening, and extending down the other of said sidewalls into engagement with the second mentioned parallel surface of said first resilient gasket, and having a surface parallel to and spaced from the first mentioned parallel surface of said first resilient gasket, adapted to sealingly engage a face portion of a construction panel; and a third resilient gasket element engaging the two mentioned surfaces of said first gasket element and the surface of said second gasket element, and adapted to engage an edge portion of a construction panel to cushion the same.

2. The combination as defined in claim 1 wherein said third resilient gasket element is of generally circular cross section.

References Cited
UNITED STATES PATENTS

| | | | |
|---|---|---|---|
| 2,233,335 | 2/1941 | Axe et al. | 52—400 |
| 2,247,933 | 7/1941 | Willer | 52—400 |
| 2,248,297 | 7/1941 | Chaffee | 52—400 |
| 2,310,621 | 2/1943 | Edwards et al. | 52—400 X |
| 2,831,553 | 4/1958 | Pollock | 52—400 |
| 3,230,677 | 1/1966 | Brown | 52—400 X |
| 3,333,382 | 8/1967 | De Ridder | 52—400 X |

FRANK L. ABBOTT, *Primary Examiner.*

ALFRED C. PERHAM, *Assistant Examiner.*

U.S. Cl. X.R.

52—396, 403